(12) United States Patent
Chen et al.

(10) Patent No.: US 12,106,036 B2
(45) Date of Patent: Oct. 1, 2024

(54) DOCUMENT PROCESSING DEVICE, METHOD OF GENERATING PREVIEW IMAGE AND COMPUTER PROGRAM PRODUCT

(71) Applicant: AVISION INC., Hsinchu (TW)

(72) Inventors: Syu-Yang Chen, Hsinchu (TW); Chung-Hsien Yeh, Hsinchu (TW)

(*) Notice: Subject to any disclaimer, the term of this patent is extended or adjusted under 35 U.S.C. 154(b) by 0 days.

(21) Appl. No.: 17/872,017

(22) Filed: Jul. 25, 2022

(65) Prior Publication Data

US 2023/0076051 A1   Mar. 9, 2023

(30) Foreign Application Priority Data

Sep. 9, 2021   (TW) .................. 110133495

(51) Int. Cl.
  *G06F 40/00* (2020.01)
  *G06F 40/106* (2020.01)
  *G06T 3/60* (2006.01)

(52) U.S. Cl.
  CPC .............. *G06F 40/106* (2020.01); *G06T 3/60* (2013.01)

(58) Field of Classification Search
  CPC ................................ G06F 40/106; G06T 3/60
  See application file for complete search history.

(56) References Cited

U.S. PATENT DOCUMENTS 5,889,893 A * 3/1999 Robson ............. G06T 3/60
  358/1.9
9,374,482 B2 * 6/2016 Nishioka ........... H04N 1/00381
2007/0157084 A1 * 7/2007 Yano ............. H04N 1/00453
  715/234
2008/0239329 A1 * 10/2008 Kitada ............. H04N 1/00474
  358/1.15
2009/0161174 A1 * 6/2009 Takeuchi ........... H04N 1/0035
  715/273
2009/0310814 A1 * 12/2009 Gallagher ........... G06F 16/58
  382/100
2010/0103481 A1 * 4/2010 Morimoto ........ H04N 1/00437
  358/474

(Continued)

FOREIGN PATENT DOCUMENTS

CN    1690947     * 11/2005
CN    1690947 A     11/2005

(Continued)

*Primary Examiner* — Barbara M Level (57) ABSTRACT

A document processing device, a method of processing an image thereof, and a computer program product are disclosed. A set of display area information is preset on the document processing device. When the document processing device receives an input image, a set of reference information corresponding to the input image is obtained. The document processing device adjusts the input image according to the set of display area information and the set of reference information to generate an improved preview image. Because the user does not need to consider the direction in which the document is put into the document processing device, the document processing device directly and automatically generates the preview image that is convenient for the user to view based on the input image, thereby achieving the purpose of improving work efficiency, the convenience in use, and the user experience.

18 Claims, 7 Drawing Sheets

(56) References Cited

U.S. PATENT DOCUMENTS

| | | | | |
|---|---|---|---|---|
| 2012/0105886 A1* | 5/2012 | Takai | ................... | G06F 3/04886 |
| | | | | 345/173 |
| 2014/0240783 A1* | 8/2014 | Panek | .................... | H04N 19/90 |
| | | | | 358/1.16 |
| 2020/0412884 A1* | 12/2020 | Kubota | ................ | H04N 1/3877 |
| 2022/0101495 A1* | 3/2022 | Qin | ....................... | G06F 3/0482 |

FOREIGN PATENT DOCUMENTS

| | | |
|---|---|---|
| CN | 101115126 A | 1/2008 |
| TW | 515195 B | 12/2002 |

* cited by examiner

(Prior Art)
DOCUMENT PROCESSING DEVICE, METHOD OF GENERATING PREVIEW IMAGE AND COMPUTER PROGRAM PRODUCT

CROSS-REFERENCE TO RELATED APPLICATION

This non-provisional application claims priority under 35 U.S.C. § 119(a) on Patent Application No. 110133495 filed in Taiwan, R.O.C. on Sep. 9, 2021, the entire contents of which are hereby incorporated by reference.

BACKGROUND OF THE INVENTION

1. Field of the Invention

The present disclosure relates to a document processing device, and in particular to a document processing device that automatically adjusts a preview image, a method of processing the image thereof, and a computer program product.

2. Description of the Related Art

With the advent of multi-function devices, not only can paper document printing be provided, but paper document scanning can also be provided, thereby improving the efficiency of paperwork processing.

Figure 6:
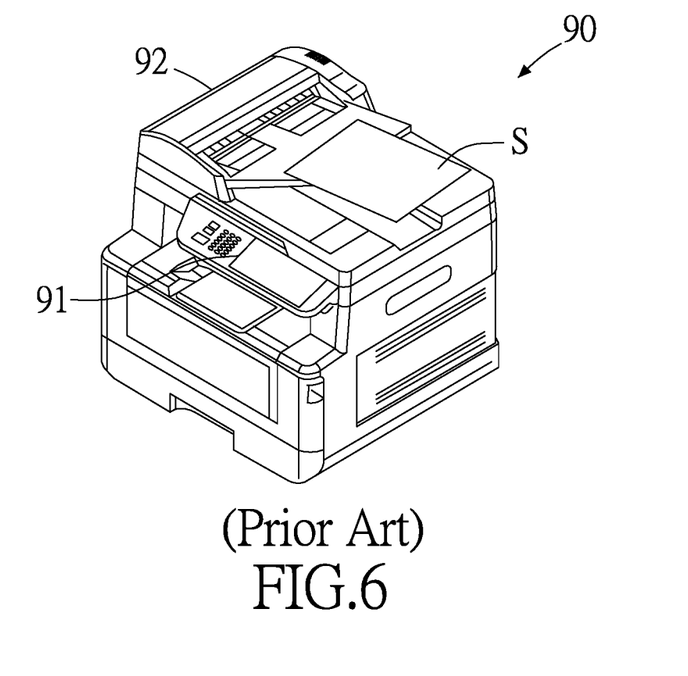
FIG. 6 is a schematic view of a prior art document processing device.
Figure 7:
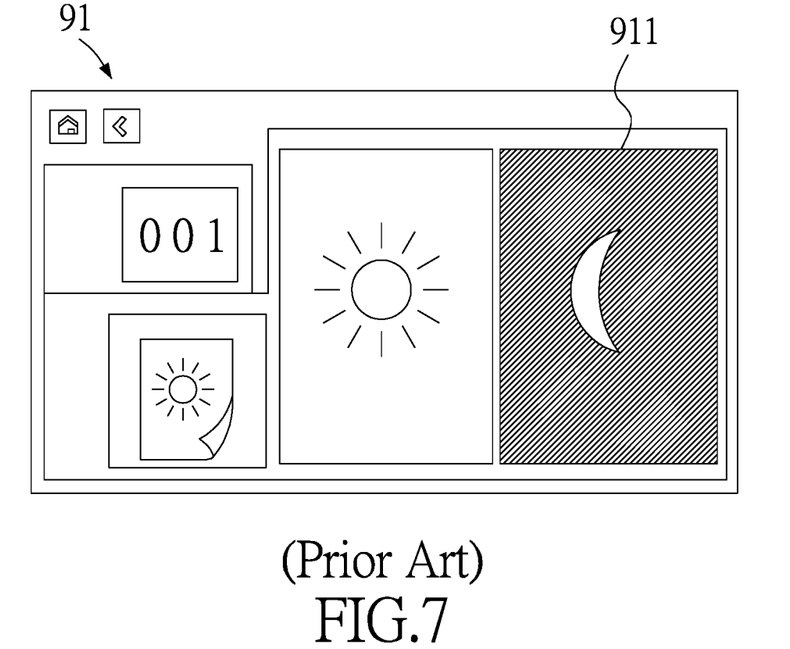
FIG. 7 is a schematic view of a prior art displaying a preview image.

Referring to FIGS. 6 to 9, the multi-function device 90 is usually equipped with a display panel 91 thereon, the display panel 91 includes a document preview area 911 and an operating area. The shape of the document preview area 911 is approximately the size of A4 paper in portrait orientation, and is used to display a preview image of the document (as shown in FIG. 7).

Figure 8:
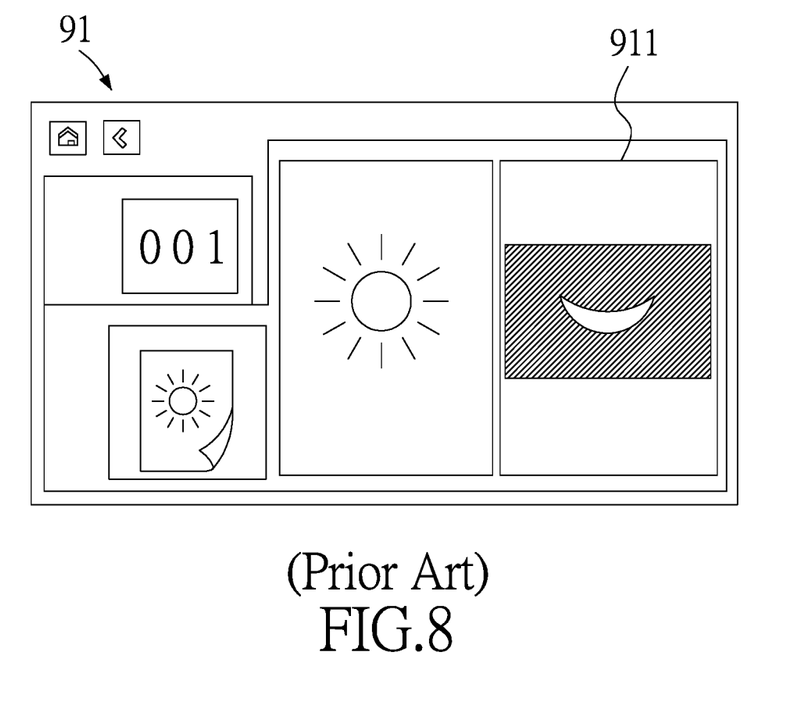
FIG. 8 is another schematic view of a prior art displaying a preview image.
Figure 9:
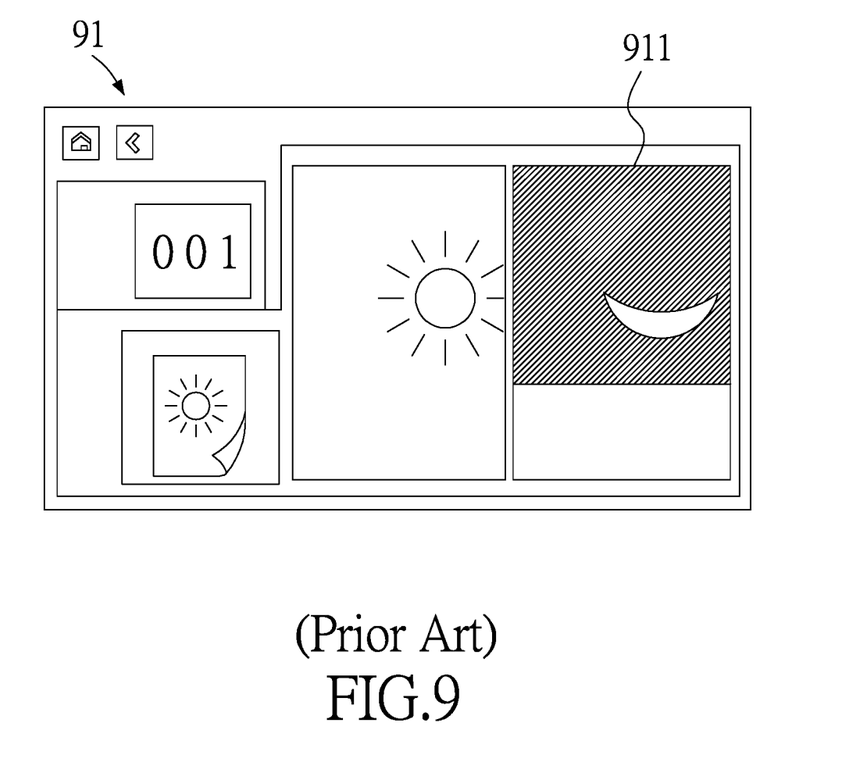
FIG. 9 is still another schematic view of a prior art displaying a preview image.

Referring to FIGS. 6 and 7 at the same time, when a user places a document S in an auto document feeder (ADF) 92 of the multi-function device 90, the user refers to the orientation of the document preview area 911 because the user fails to know the direction of placing the document in the ADF 92, and the long side of the document S is aligned with and placed in the ADF 92, resulting in a preview image displayed in the document preview area 911 rendered horizontally (as shown in FIG. 8), and the size of the preview image is smaller than the size of the document preview area 911. Also, as shown in FIG. 9, even if the preview image is magnified through the operating area, it is prone to offsets and misalignments, which are very inconvenient for the user.

When the above problems occur, the user may choose to remove the document, and then change the orientation of the document and place it back into the ADF, which is a waste of time. Alternatively, because the user doesn't bother to reposition the document, the user chooses to view it with a crooked head, however, it is not only unclear and inconvenient to confirm, but it can also cause cervical discomfort. Therefore, better solutions need to be developed.

BRIEF SUMMARY OF THE INVENTION

In view of the shortcomings of the prior art, an objective of the present disclosure is to provide a document processing device that automatically adjusts a preview image, a method of processing the image thereof, and a computer program product. The present disclosure can provide a suitable preview image for the user to view by automatically adjusting the input image. The user does not need to consider the orientation in which the document is put into the document processing device, since the document processing device of the present disclosure directly and automatically adjusts the preview image, thereby achieving the purpose of improving work efficiency, the convenience in use, and the user experience.

To achieve the above objective and more, the present disclosure provides the aforementioned document processing device, which comprises:

an image input module;

a display module, having a document preview area;

a storage module, storing a set of preset display area information;

a processing module, connected with the image input module, the display module and the storage module;

wherein when the processing module receives an input image through the image input module, a set of reference information is obtained according to the input image; the processing module adjusts the input image according to the set of display area information and the set of reference information to generate a better preview image.

To achieve the objective and more, the present disclosure provides a method of processing an image of the aforementioned document processing device, executed on the document processing device, the method comprising:

presetting a set of display area information;

obtaining a set of reference information of an input image when receiving the input image; and adjusting the input image according to the set of display area information and the set of reference information to generate an improved preview image.

To achieve the objective and more, the present disclosure further provides a computer program product, and when the computer program product is executed on the document processing device, the document processing device executes the method of processing an image of the document processing device.

According to the above content, in use, the user does not need to consider the orientation in which the document is put into the document processing device, the document processing device directly and automatically adjusts to generate and display an improved preview image for the user to view and confirm based on the input image, thereby achieving the purpose of improving work efficiency, the convenience in use, and the user experience.

DETAILED DESCRIPTION OF THE INVENTION

Figure 1:
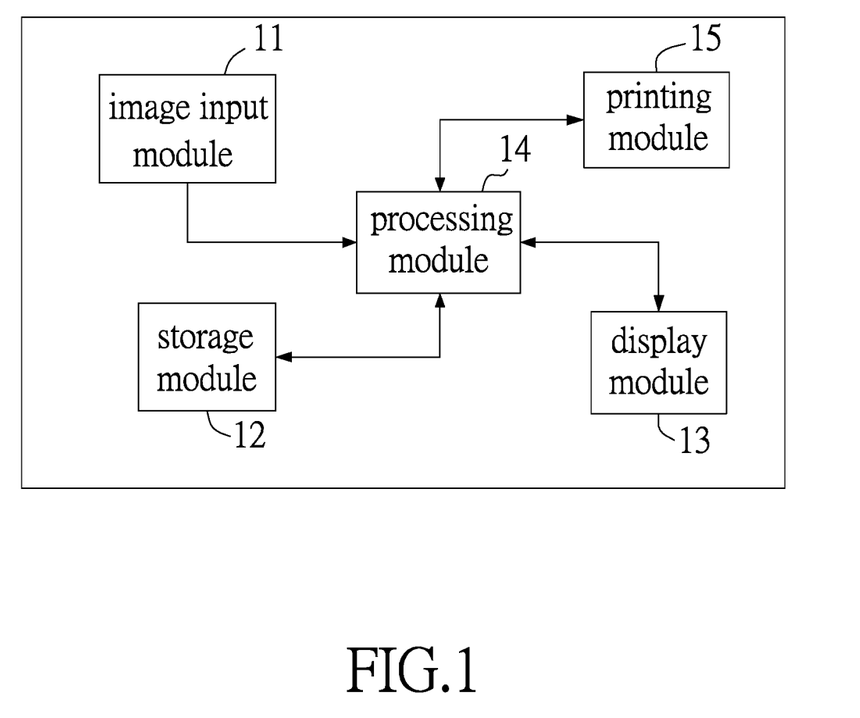
FIG. 1 is a framework block diagram of a document processing device according to a preferable embodiment of the present disclosure.

Refer to FIG. 1, which shows a document processing device that automatically adjusts a preview image according to a preferable embodiment of the present disclosure. The document processing device comprises an image input module 11, a storage module 12, a display module 13 and a processing module 14, wherein the processing module 14 is respectively connected with the image input module 11, the storage module 12, and the display module 13. In an embodiment, the document processing device is a multifunction product/printer/peripheral (MFP).

Referring to FIG. 1, in an embodiment, the image input module 11 may be a scanning module used to obtain more than one input image. The image input module 11 may further comprise an auto document feeder (ADF) (not shown in the drawing) to connect with the scanning module.

Referring to FIG. 1, in an embodiment, the storage module 12 is used to store the data/information that is received, the relevant data/information to be processed, the relevant data/information that has been processed, etc. Specifically, the storage module 12 may be a memory, for example but not limited to non-volatile memory, dynamic random access memory (DRAM), flash memory, a high disk drive (HDD) or a solid-state drive/solid-state disk (SSD), etc.

Figure 3:
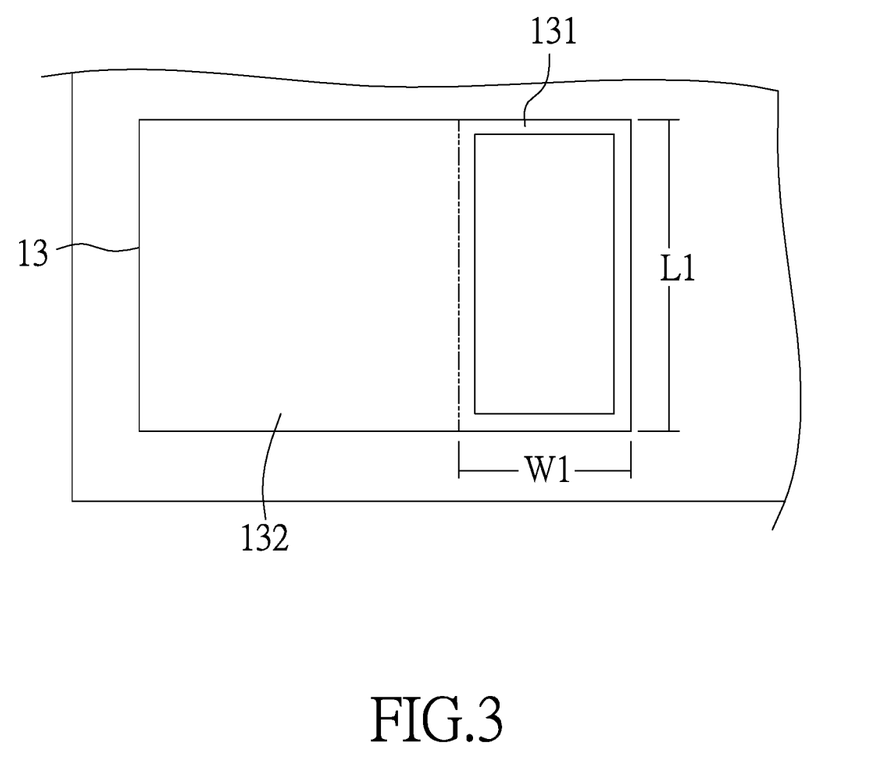
FIG. 3 is a schematic view of displaying the preview image on a display module of the document processing device of the present disclosure.

Referring to FIGS. 1 and 3, in an embodiment, the display module 13 is used to display relevant data/information or an image. The display module 13 may be a touch display and is provided with a document preview area 131 and an operating area 132. The document preview area 131 is used to display data/information or an image. The operating area 132 is used for operation, wherein the shape of the document preview area 131 is approximately the shape of, for example, A4 paper, and comprises two corresponding first long sides L1 and two corresponding first short sides W1. The area of the document preview area 131 is defined by the range around the first long sides L1 and the first short sides W1.

Referring to FIG. 1, in an embodiment, the processing module 14 is used to process the data/information that is received, the data/information that is stored in the storage module 12, etc. Specifically, referring to FIG. 2 at the same time, the processing module 14 comprises a central processor 141 and an image processor 142 that are connected with each other. The central processor 141 is used to process the relevant data/information, or the relevant image information after processed by the image processor 142. The image processor 142 is used to carry out the relevant image processing for the input image. The central processor 141 is a central processing unit (CPU). The image processor 142 is an application specific integrated circuit (ASIC).

Referring to FIG. 1, in an embodiment, the document processing device further comprises a printing module 15, which is connected to the processing module 14. The printing module 15 is driven by the central processor 141 to output the input image.

Figure 2:
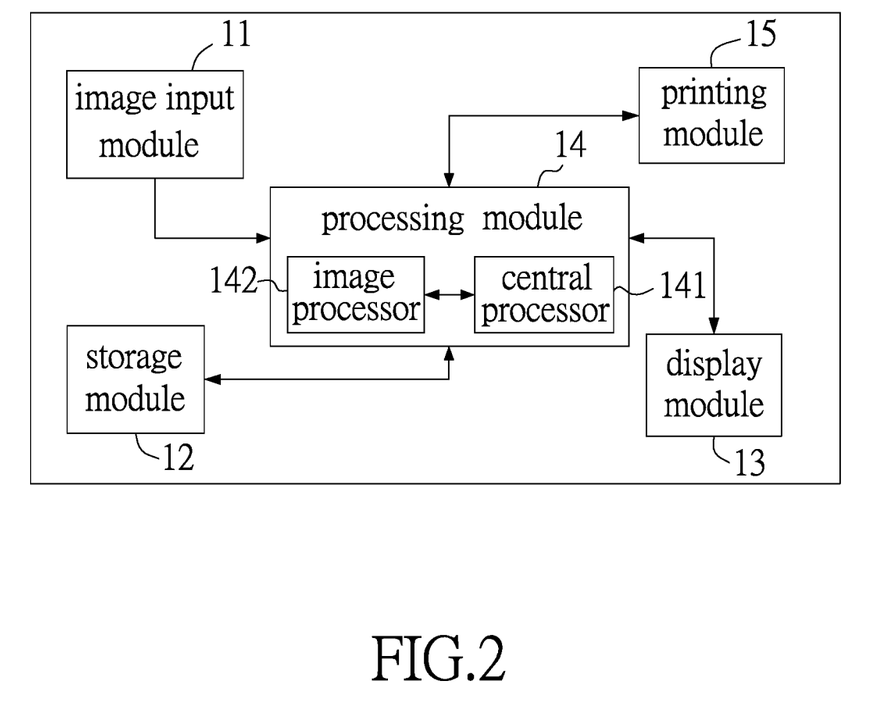
FIG. 2 is another framework block diagram of a document processing device according to a preferable embodiment of the present disclosure.

Referring to FIGS. 2 and 3, when the document processing device of the present disclosure receives an input image and detects that the input image needs to be adjusted, the input image is automatically adjusted and a preview image of the automatically adjusted input image is displayed to facilitate the user to view. The following describes how the document processing device of the present disclosure automatically adjusts the preview image of the input image to facilitate the user to view the content.

Figure 4:
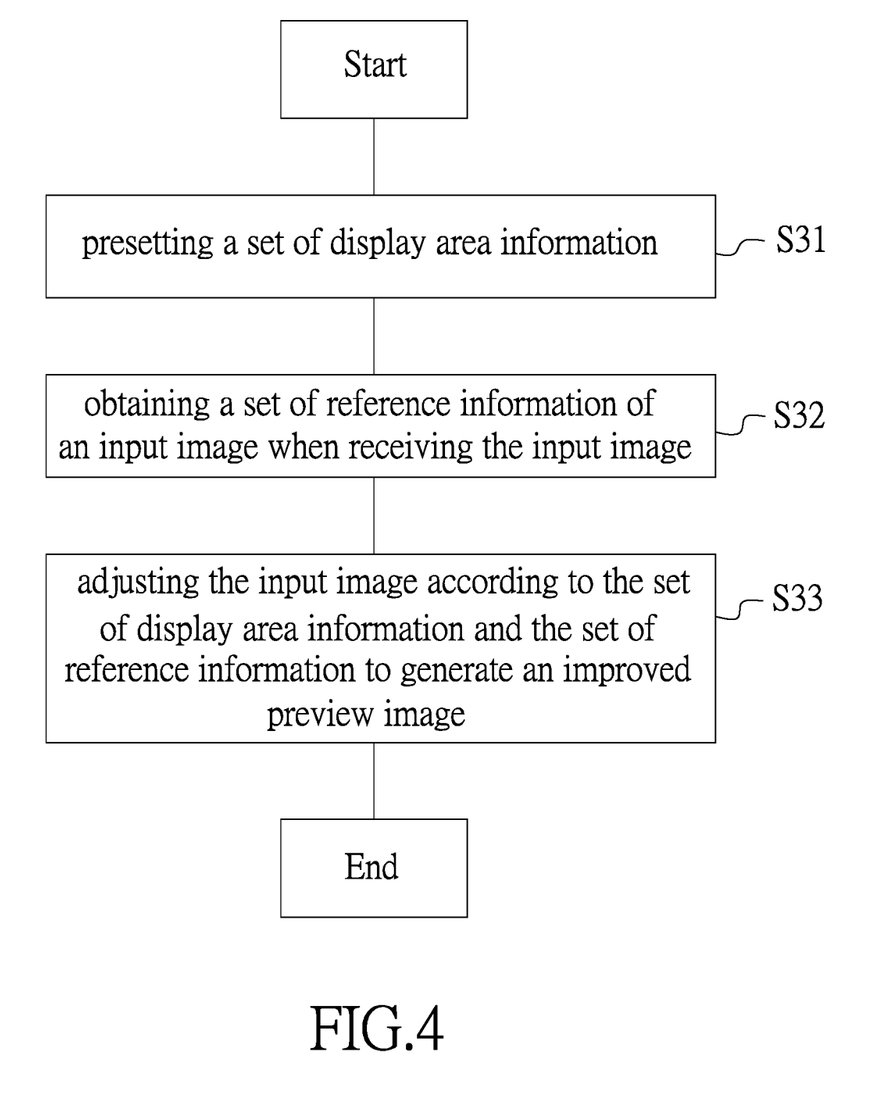
FIG. 4 is a flow chart of a method of processing an image of the document processing device of the present disclosure.

Referring to FIGS. 2 and 4, specifically, a method of processing image of a document processing device that automatically adjusts the preview image is executed in the document processing device of the present disclosure, which comprises multiple steps, wherein the first step S31 is that the central processor 141 of the processing module 14 presets a set of display area information.

Referring to FIGS. 2 and 3, the central processor 141 of the processing module 14 presets a set of display area information according to the document preview area 131 of the display module 13, and stored in the storage module 12. The set of display area information comprises a set of first long side information, a set of first short side information, a set of first area dimension information, and a set of first pixel information.

The set of first long side information comprises a length information, a position information and a direction information of the first long sides L1.

The set of first short side information comprises a length information, a position information and a direction information of the first short sides W1.

The set of first area dimension information comprises an area dimension information of the document preview area 131.

The set of first pixel information comprises the relevant information of multiple first pixels.

In an embodiment, after step S31 is executed the first time, the set of display area information can be used directly afterwards without having to be preset at each execution. In addition, step S31 can also be re-executed at each execution to improve the accuracy of the set of display area information obtained.

Referring to FIGS. 2 and 4, after the central processor 141 presets and completes the set of display area information, the second step S32 is successively executed, wherein the second step S32 is that when the image input module 11 receives an input image, the central processor 141 of the processing module 14 obtains a set of reference information of the input image.

Figure 5:
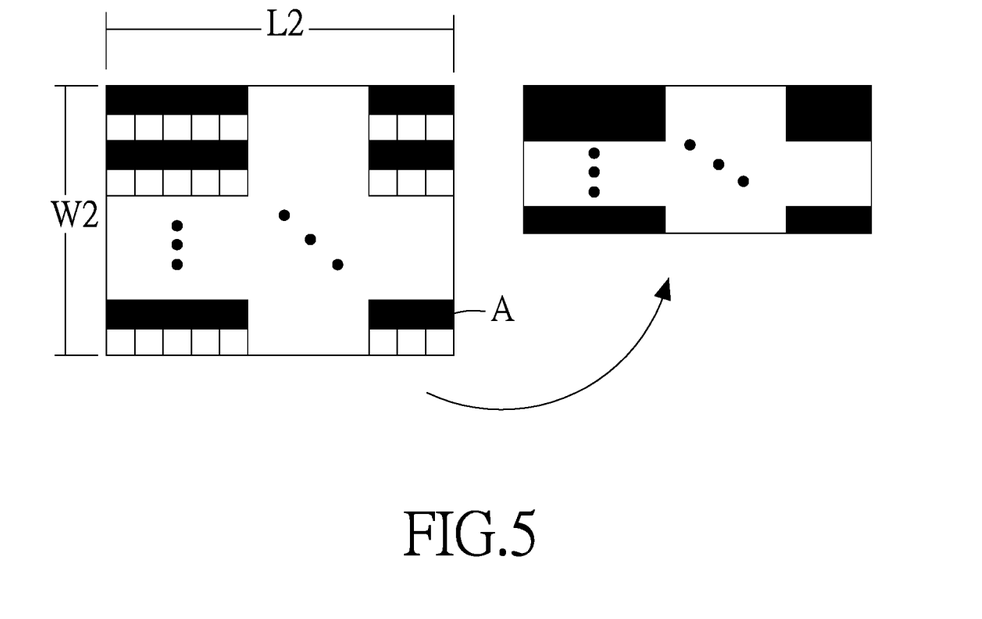
FIG. 5 is a schematic view of the document processing device carrying out image point-taking and thumbnail for the image of the present disclosure.

Referring to FIGS. 2 and 5, the set of reference information comprises a set of second long side information, a set of second short side information, a set of second area dimension information, and a set of second pixel information that correspond to the input image. The input image comprises two corresponding second long sides L2 and two corresponding second short sides W2, and the area of the input image is defined by the range around the second long sides L2 and the second short sides W2.

The set of second long side information comprises a length information, a position information and a direction information of the second long sides L2.

The set of second short side information comprises a length information, a position information and a direction information of the first short sides W2.

The set of second area dimension information comprises an area dimension information of the input image.

The set of second pixel information comprises multiple second pixel relevant information of the input image (black and white blocks as indicated in FIG. 5).

In addition, in FIG. 5, the pixels marked A (the black blocks indicated in FIG. 5) are multiple selected pixels A, and the relevant information of the first and second pixels mentioned above may comprises color information or position information, the specific application of which is described later.

After the reference information of the input image is obtained, referring to FIGS. 2 and 4, the central processor 141 of the processing module 14 successively executes the third step. The third step S33 is that the central processor 141 of the processing module 14 adjusts the input image to generate an improved preview image according to the set of display area information and the set of reference information.

Specifically, the central processor 141 of the processing module 14 detects a long side position of the input image according to the set of display area information and the set of reference information. When the central processor 141 determines that the input image needs to be adjusted according to the detected long side position, the central processor 141 correspondingly adjusts the input image and generates the improved preview image. Conversely, when the central processor 141 determines that the input image does not need to be adjusted, it directly drives the display module 13 to display the preview image of the input image on the document preview area 131.

Referring to FIGS. 2 and 4, the central processor 141 determines whether the position information or direction information in the set of first long side information corresponds according to the position information or direction information in the set of second long side information, in order to detect the long side position of the input image. When the central processor 141 determines the position information or direction information in the set of second long side information fails to correspond to the position information or direction information in the set of first long side information, the central processor 141 determines that the input image is to be adjusted.

When the central processor 141 determines that the input image needs to be adjusted, the central processor 141 carries out an image rotation processing for the input image according to the first long side information and the first pixel information in the set of display area information, as well as the second long side information and the second pixel information in the set of reference information, in order to adjust the second long side L2 (as shown in FIG. 5) of the input image to correspond to the first long side L1 of the document preview area 131 (as shown in FIG. 3) to generate the improved preview image.

When the improved preview image is generated, the central processor 141 drives the display module 13 to display the improved preview image (the preview image of the adjusted input image) in the document preview area 131, thereby achieving an accurate adjustment of the input image to a better preview image that is suitable for preview and matches the document preview area 131.

In an embodiment, when the central processor 141 carries out the image rotation processing for the input image, each pixel in the set of second pixel information is stored in the storage module 12 in sequence, and then pixels of the corresponding second pixel information are taken out in sequence according to the position of each pixel in the set of first pixel information, in order to complete the rotation of the input image.

In addition to the image rotation processing carried out according to the second long side L2 of the input image and the first long side L1 of the document preview area 131, the image rotation processing can also be carried out according to the second short side W2 of the input image and the first short side W1 of the document preview area 131. Because the content of image rotation processing according to the short side is the same as that of image rotation processing according to the long side, it is not detailed herein for the simplicity of the specification.

Further, in order to improve the speed and efficiency of the central processor 141 carrying out the image rotation processing, the image processor 142 first carries out an image thumbnail processing for the input image to generate an input image thumbnail. The central processor 141 then executes the image rotation processing according to the input image after the thumbnail is generated.

The method of the image processor 142 carrying out the image thumbnail processing for the input image is shown as FIGS. 2 and 5. Based on the second pixel information in the set of reference information, the image processor 142 uses an interval point-taking algorithm to select the selected pixels A which are separated with each other (black blocks as indicated in the drawing). The image processor 142 generates the input image thumbnail according to the selected pixels A. By reducing the proportion of the input image, the processing efficiency and speed of the rotation of the input image after the thumbnail is generated can be improved.

In an embodiment, the method of using the interval point-taking algorithm to obtain the selected pixels A may select from the left side to the right side (direction in the drawing), or the right side to the left side, or from the upper side to the lower side, or from the lower side to the upper side of the input image, and in the form of interval spacing. In FIG. 5, the example of from the upper side to the lower side is illustrated, but not limited to herein.

Referring to FIGS. 2 and 3, after the user confirms that there is no problem with the content according to the preview image of the input image displayed in the document preview area 131 of the display module 13, the user can input a printing instruction by operating the operating area 132 of the display module 13, and the central processor 141 of the processing module 14 drives the printing module 15 to output the input image according to the printing instruction.

In addition, in further embodiments, according to one or more of the above embodiments of the method of processing an image of the document processing device that automatically adjusts the preview image, a computer program product including a non-transitory storage medium having program instructions stored thereon can be provided, and when the program instructions of the computer program product are executed on the document processing device of the present disclosure, the document processing device of the present disclosure executes the method of processing an image of the document processing device that automatically adjusts the preview image. Non-transitory storage media can include, but not limited to, read only memory (ROM), random access memory (RAM), magnetic disk storage media, optical storage media, flash memory, and so on.

According to the above content, in use, because the user does not need to consider the direction in which the document is put into the document processing device, the document processing device of the present disclosure directly and automatically adjusts to generate and display an improved preview image for the user to view and confirm based on the input image, thereby achieving the purpose of improving work efficiency, the convenience in use, and the user experience.

What is claimed is:

1. A document processing device, comprising:
   a display module, having a document preview area that is defined by two first long sides and two first short sides;
   a storage module, for storing a set of display area information related to the document preview area, wherein the set of display area information comprises a set of first long side information related to the two first long sides of the document preview area, wherein the set of first long side information comprises a length information, a position information and a direction information of the two first long sides;
   an image input module, configured to receive an input image that is defined by two second long sides and two second short sides; and
   a processing module, connected with the image input module, the display module, and the storage module;
   wherein the processing module is configured to receive the input image through the image input module and a set of reference information comprising a set of second long side information related to the two second long sides of the input image, wherein the set of second long side information comprises a length information, a position information and a direction information of the two second long sides;
   wherein the processing module adjusts the input image according to the set of display area information and the set of reference information to generate an improved preview image that corresponds to the document preview area;
   wherein, when the processing module determines the position information or direction information in the set of second long side information fails to correspond to the position information or direction information in the set of first long side information, the processing module carries out an image rotation processing for the input image to generate the improved preview image and the document preview area only displays the one improved preview image.

2. The document processing device according to claim 1, wherein the processing module comprises:
   an image processor, for carrying out an image processing for the input image; and
   a central processor, connected with the image processor, for carrying out a processing for the input image or carrying out a processing for an image after processed by the image processor.

3. The document processing device according to claim 2, wherein the central processor detects a long side position of the input image according to the set of display area information and the set of reference information; when the central processor determines that the input image needs to be adjusted according to the detected long side position, the central processor adjusts the input image and generates the improved preview image.

4. The document processing device according to claim 3, wherein the central processor carries out the image rotation processing for the input image according to the set of first long side information and a set of first pixel information in the set of display area information, as well as the set of second long side information and a set of second pixel information in the set of reference information, in order to adjust one of the two second long sides of the input image to correspond to one of the two first long sides of the document preview area to generate the improved preview image, wherein the set of first pixel information is related to pixels of the document preview area and the set of second pixel information is related to pixels of the input image.

5. The document processing device according to claim 4, wherein before the central processor carries out the image rotation processing for the input image, the image processor carries out an image thumbnail processing for the input image to generate an input image thumbnail, the central processor executes the image rotation processing according to the input image after the thumbnail is generated.

6. The document processing device according to claim 5, wherein the image processor selects multiple selected pixels according to the second pixel information in the set of reference information to generate the input image thumbnail.

7. The document processing device according to claim 1, further comprising a printing module connected with the processing module to output the input image.

8. The document processing device according to claim 1, wherein the document processing device is a multi-function product.

9. A method of processing an image of a document processing device, executed on the document processing device with a document preview area, the method comprising:
   presetting a set of display area information related to the document preview area, wherein the set of display area information comprises a set of first long side information related to two first long sides of the document preview area that is defined by the two first long sides and two first short sides, wherein the set of first long side information comprises a length information, a position information and a direction information of the two first long sides;
   obtaining a set of reference information of an input image comprising a set of second long side information related to two second long sides of the input image when receiving the input image that is defined by the two second long sides and two second short sides, wherein the set of second long side information comprises a length information, a position information and a direction information of the two second long sides; and
   adjusting the input image according to the set of display area information and the set of reference information to generate an improved preview image that corresponds to the document preview area,
   wherein, when the position information or direction information in the set of second long side information fails to correspond to the position information or direction information in the set of first long side information, an image rotation processing is executed for the input image to generate the improved preview image and only the one improved preview image is displayed in the document preview area.

10. The method of processing an image of a document processing device according to claim 9, wherein when executing the step of adjusting the input image according to the set of display area information and the set of reference information to generate the improved preview image that corresponding to the document preview area, the following steps are carried out:
    detecting a long side position of the input image according to the set of display area information and the set of reference information;

wherein when determining that the input image needs to be adjusted according to the long side position that was detected, adjusting the input image and generating the improved preview image.

11. The method of processing an image of a document processing device according to claim 10, further comprising carrying out the image rotation processing for the input image according to the set of first long side information and a set of first pixel information in the set of display area information, as well as the set of second long side information and a set of second pixel information in the set of reference information, in order to adjust the two second long sides of the input image to correspond to the two first long sides of the document preview area to generate the improved preview image.

12. The method of processing an image of a document processing device according to claim 11, wherein before carrying out the image rotation processing for the input image, carrying out an image thumbnail processing for the input image to generate an input image thumbnail, and executing the image rotation processing according to the input image after the input image thumbnail is generated.

13. The method of processing an image of a document processing device according to claim 12, further comprising selecting multiple selected pixels according to the second pixel information in the set of reference information to generate the input image after the thumbnail is generated.

14. A computer program product including a non-transitory storage medium having program instructions stored thereon that, when executed on a document processing device with a document preview area, cause the document processing device to execute a method of processing an image of the document processing device, the method comprising steps of:
presetting a set of display area information related to the document preview area, wherein the set of display area information comprises a set of first long side information related to two first long sides of the document preview area that is defined by the two first long sides and two first short sides, wherein the set of first long side information comprises a length information, a position information and a direction information of the two first long sides;
obtaining a set of reference information of an input image comprising a set of second long side information related to two second long sides of the input image when receiving the input image that is defined by the two second long sides and two second short sides, wherein the set of second long side information comprises a length information, a position information and a direction information of the two second long sides; and
adjusting the input image according to the set of display area information and the set of reference information to generate an improved preview image that corresponds to the document preview area,
wherein, when the position information or direction information in the set of second long side information fails to correspond to the position information or direction information in the set of first long side information, an image rotation processing is executed for the input image to generate the improved preview image and only the one improved preview image is displayed in the document preview area.

15. The computer program product according to claim 14, wherein when executing the step of adjusting the input image according to the set of display area information and the set of reference information to generate the improved preview image that corresponding to the document preview area, the following steps are carried out:
detecting a long side position of the input image according to the set of display area information and the set of reference information;
wherein when determining that the input image needs to be adjusted according to the long side position that was detected, adjusting the input image and generating the improved preview image.

16. The computer program product according to claim 15, wherein the method further comprises carrying out the image rotation processing for the input image according to the set of first long side information and a set of first pixel information in the set of display area information, as well as the set of second long side information and a set of second pixel information in the set of reference information, in order to adjust the two second long sides of the input image to correspond to the two first long sides of the document preview area to generate the improved preview image.

17. The computer program product according to claim 16, wherein before carrying out the image rotation processing for the input image, carrying out an image thumbnail processing for the input image to generate an input image thumbnail, and executing the image rotation processing according to the input image after the input image thumbnail is generated.

18. The computer program product according to claim 17, wherein the method further comprises selecting multiple selected pixels according to the second pixel information in the set of reference information to generate the input image after the thumbnail is generated.

* * * * *